Feb. 10, 1959     A. D. GARRISON     2,873,399
RADIATION DETECTOR
Filed May 27, 1954
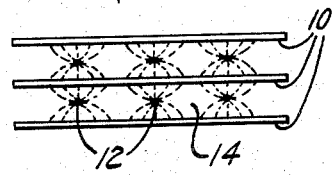
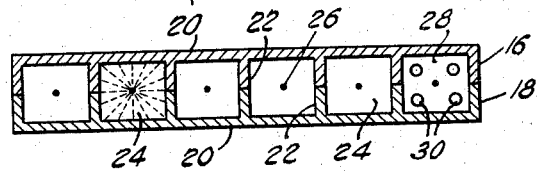
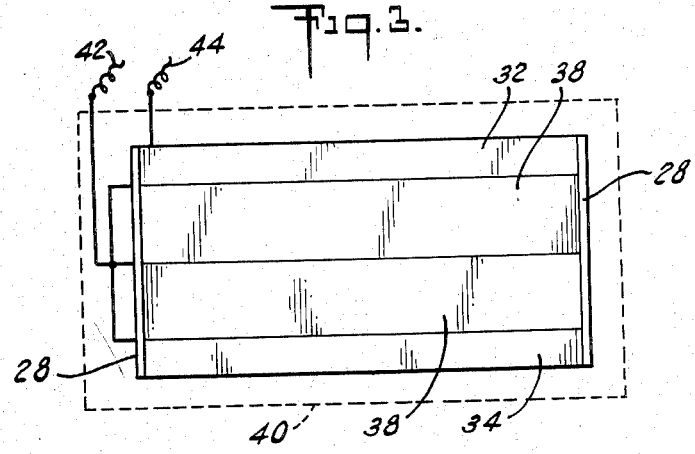
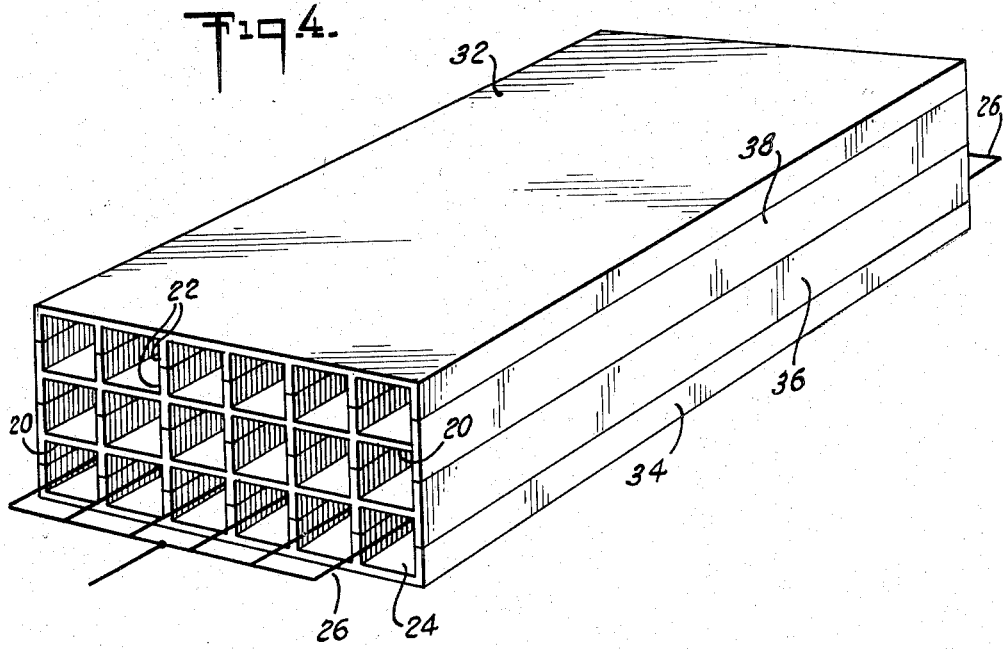

United States Patent Office 2,873,399
Patented Feb. 10, 1959

2,873,399

RADIATION DETECTOR

Allen D. Garrison, Houston, Tex., assignor to Texaco Development Corporation, New York, N. Y., a corporation of Delaware Application May 27, 1954, Serial No. 432,654

5 Claims. (Cl. 313—93)

This invention relates to the detection and measurement of penetrative radiation and more particularly to a detector of gamma rays. The principal objective of the invention is the provision of a device of this type which will have an efficiency higher than the conventional detectors of the "counter" type and which can also be constructed with greater ease and rapidity than most gamma ray detectors of the multicathode plate type.

In the U. S. Letters Patent No. 2,397,073, granted March 19, 1946, to D. G. C. Hare and G. Herzog, a gamma ray detector is disclosed which has an efficiency from 5 to 10 times as great as a conventional Geiger-Mueller counter of the same volume. The detector disclosed in that patent comprises generally a plurality of thin parallel cathode plates disposed in spaced relation and with an anode comprising a plurality of wires arranged in the form of a grid between and insulated from the adjacent cathode plates. While, as stated above, this detector is several times more efficient than the conventional Geiger-Mueller detector of the same volume, it has been found that the electrical field between the anode wires and the cathode plates is frequently not uniform and "dead" spaces exist. In the detector to be described, these dead spaces are eliminated and thus substantially the entire volume of the detector is effective in the measurement of penetrative radiation.

For a better understanding of the invention, reference may be had to the accompanying drawing in which Fig. 1 is an end view of the cathode and anode electrodes of a detector such as is described in the aforementioned Hare-Herzog patent;

Fig. 2 is an end view of the cathode and anode of a detector embodying one form of the present invention;

Fig. 3 is a side elevation somewhat diagrammatic showing a detector of the type shown in Fig. 2 but embodying a plurality of cathode and anode sections; and Fig. 4 is an isometric view, again somewhat diagrammatic, showing the electrodes of a detector such as is illustrated in Fig. 3.

Referring to the drawing and particularly to Fig. 1 thereof, the essential parts of a small gamma ray detector of the gas amplification, electrical pulse-producing type are shown. This type of detector is disclosed in greater detail in the aforementioned Hare-Herzog patent and comprises two or more thin metallic cathode plates 10 disposed in parallel spaced relation. Between each pair of cathode plates 10 is a plurality of anode wires 12 disposed in parallel separated relation and equally spaced between the adjacent cathode plates in the form of a grid. It will be understood by those familiar with this subject that the electrodes illustrated in Fig. 1 are mounted within a suitable sealed housing of glass, metal, or the like, which housing contains a gaseous mixture such, for example, as a mixture of about 97 percent argon and 3 percent anhydrous ammonia, usually at a pressure around atmospheric or less. A high potential of about 1000 volts is connected across the cathode and the anode and when a gamma ray strikes one of the cathode plates, an electron may be ejected into the gaseous filling to produce ionization and an electrical pulse. These pulses can be measured in any suitable manner and the number of pulses per unit of time will be a measure of the intensity of the gamma rays in the vicinity of the detector.

The concentration of the electrical field existing between the anode wires 12 and the cathode plates 10 is illustrated in Fig. 1 by means of the dotted lines. It will be observed that this field is most intense between each wire and the nearest portions of the adjacent cathode plates and also that there are dead spaces 14 where the field either does not exist or is too weak to produce any useful effect. As has been stated hereinabove, it is the object of the invention to provide a detector in which all of the volume or space of the detector is effective and in which there are no dead spaces.

In Fig. 2 is illustrated a simple form of detector embodying the present invention and in which the cathode is formed of a pair of metal elements 16 and 18, each element consisting of a flat plate-like member 20 from one side surface of which projects a plurality of evenly spaced parallel fins 22. All of these fins are identical, i. e., they project the same distance from the flat plate 20 and the fins 22 and plate 20 form a plurality of troughs or grooves of uniform shape and size. Two cathode elements 16 and 18 are placed together in juxtaposition so that the outer edges of the fins 22 of one section engage or contact the outer edges of the fins of the other section. In this manner a plurality of elongated openings 24 are provided, these openings being symmetrical in cross section and each opening being formed of a pair of the aforementioned troughs. In the detector shown in Fig. 2, the openings 24 are square in cross section and an anode wire 26 is disposed along the longitudinal axis of each of the openings. In one of the openings 24 the electrical field is illustrated by means of dotted lines and it will be observed that this field is uniform in its concentration and that no dead spaces exist, in contrast with the field as illustrated in the detector of Fig. 1.

The ends of the cathode sections 16 and 18 may be provided with cover plates 28 of suitable insulating material, each of these plates being provided with a plurality of holes 30. The anode wires 26 are stretched between the insulating plates 28 and the assembly as illustrated in Fig. 2, then placed within a suitable housing or envelope containing the gaseous filling as mentioned above. The holes 30 in the insulating cover plates 28 permit the gaseous filling to fill each of the openings 24 and thereby be maintained at uniform pressure throughout the detector.

In Figs 3 and 4 a detector is illustrated which is made up of a plurality of cathode and anode sections. As will be observed with reference to Fig. 4, the upper and lower cathode sections 32 and 34 are similar in shape to the sections 16 and 18 shown in Fig. 2. However, each of the intermediate sections 36 and 38 is provided with projecting fins 22 on each of its two sides and each of these intermediate sections therefore has a plurality of troughs or grooves symmetrically arranged on opposite sides of its flat plate 20. When assembled as shown in Fig. 4, the projecting edges of the fins of one plate engage the projecting edges of the fins of the upper and lower plates, as described with reference to Fig. 2 and as a result, a plurality, 18 in this instance, of symmetrical elongated openings 24 are provided. As was described with reference to Fig. 2, an anode wire 26 is disposed along the longitudinal axis of each of the openings 24 and these wires are all connected together electrically to form an anode grid.

In the diagrammatic illustration of Fig. 3, a cathode-anode assembly of the type illustrated in Fig. 4 is disclosed as positioned within a suitable housing or envelope 40 containing the ionizable gaseous filling. In Fig. 3 the outer sides of the cathode sections 32, 34, 36, and 38 are shown, as well as two end or cover plates 28 of electrically insulating mterial. As has been previously stated, the cover plates 28 are provided with holes 30 so that the gaseous filling will fill all of the openings 24 uniformly. Electrical connections 42 and 44 are shown diagrammatically as leading from the anode and the cathode, respectively.

As has already been stated, the provision of the cathode sections in the manner described permits a detector to be assembled and built up very rapidly. It is obvious that substantially any number of intermediate sections 36 and 38 can be assembled one on top of the other with a corresponding number of anode wires stretched through the resulting openings. The electrical field concentration between each anode wire and the adjacent cathode is uniform and there is therefore no waste or dead space within the detector. As will be noted, a gamma ray may eject an electron from any portion of the cathode within the detector and this electron will cause ionization and thus an electric pulse from the anode wire within that opening 24 into which the electron is ejected. Since each opening 24 is substantially surrounded with cathode metal, the pulse or count which is produced in this manner will not necessarily reduce chances for any or all of the other anode sections or openings 24 to be ready to receive an electron and produce a pulse in a similar manner. Thus, the effective dead time of a detector of this type is reduced to a very small value. When using a high density and atomic number metal as the cathode and with the cathode material occupying about 1/10 of the volume of the entire detector, the effective density of the detector can be made from 1–2 grams/cm.$^3$. In view of these facts, the gamma ray absorption efficiency is as high or higher than organic scintillation crystals. The volume can be made large without high assembling costs and the effective dead time can be reduced to about one microsecond.

While the detector has been described with regard to its use in detecting gamma rays, it is also contemplated that the inner surfaces of the cathode troughs or openings can be coated with a suitable neutron reactive material such as boron or lithium and the resulting device can then be used as a proportional counter to measure thermal neutrons. A neutron in striking the boron or lithium may eject an alpha particle into the gaseous filling to cause ionization and the production of an electrical pulse as is well known to those skilled in this art.

It is to be understood that the cathode plates, as illustrated in the drawing, are shown considerably thicker than those which would actually be used. Thus, the cathode plates 20 and the fins 22 may have a thickness of but a very few mills. It is also to be understood that while the openings 24 have been shown as square in cross section, this is by way of illustration only since these openings may be round, hexagonal, etc., depending upon the shape of the "trough" between each adjacent pair of fins.

Obviously, many other modifications and variations of the invention as hereinbefore set forth may be made without departing from the spirit and scope thereof and only such limitations should be imposed as are indicated in the appended claims.

I claim:

1. A radiation detector comprising a sealed housing, cathode and anode electrodes in said housing and adapted to be connected to a source of high potential, said cathode being formed of a pair of elements each of which comprises a flat plate portion with laterally projecting parallel fins along one of its side surfaces, the outer edges of the fins of one element being adapted to engage the outer edges of the fins of the other element, so as to provide a plurality of elongated openings substantially square in cross section, and said anode comprising a wire disposed along the longitudinal axis of each of said openings, the arrangement being such that a substantially uniform electric field is provided between each anode wire and the cathode elements with a minimum of dead space.

2. A radiation detector comprising a sealed housing, cathode and anode electrodes in said housing, said cathode being formed of a plurality of elements each of which comprises a plate portion with laterally projecting fins along at least one of its side surfaces, the outer edges of said fins on one side of one element being adapted to engage the outer edges of the fins on an adjacent element so as to provide a plurality of elongated openings substantially square in cross section, and said anode comprising a wire disposed along the longitudinal axis of each of said openings, the arrangement being such that a substantially uniform electrical field is provided between each anode wire and the adjacent cathode elements with a minimum of dead space.

3. A radiation detector comprising a sealed housing adapted to contain an ionizable gas, a cathode and an anode in said housing and adapted to be connected to a source of high potential, said cathode being formed of a plurality of elements each of which comprises a flat plate portion with laterally projecting fins along each of its side surfaces, the outer edges of said fins on one side of one element being adapted to engage the outer edges of the fins on an adjacent element so as to provide a plurality of elongated openings substantially square in cross section and said anode comprising an anode wire disposed along the longitudinal axis of each of said openings, the arrangement being such that a substantially uniform electric field is provided between each anode wire and the cathode element with a minimum of dead space.

4. A radiation detector comprising a sealed housing, cathode and anode electrodes in said housing and adapted to be connected to a source of high potential, said cathode being formed of a plurality of elements each of which comprises a flat plate portion with laterally projecting fins along at least one of its side surfaces, said fins thereby providing said side surfaces with a plurality of troughs, the troughs on one side of one element being in juxataposed position to the troughs on one side of an adjacent element so that said juxtaposed troughs provide a plurality of elongated openings substantially square in cross section, and said anode comprising a wire disposed along the longitudinal axis of each of said openings, the arrangement being such that a substantially uniform electric field is provided between each anode wire and the cathode element with a minimum of dead space.

5. A radiation detector comprising a sealed housing, cathode and anode electrodes in said housing and adapted to be connected to a source of high potential, said cathode being formed of a plurality of elements each of which comprises a plate portion with laterally projecting fins along at least one of its side surfaces, said fins thereby providing said side surfaces with a plurality of troughs, the troughs on one side of one element being in juxtaposition with respect to the troughs on one side of an adjacent element so that said juxtaposed troughs provide a plurality of elongated tubular openings substantially symmetrical in cross section, a member of insulating material positioned at opposite ends of each of said openings, and an anode wire suspended between the respective insulating members along the axis of each of said openings, the arrangement being such that a substantially uniform electric field is provided between each anode wire and the cathode element with a minimum of dead space.

References Cited in the file of this patent

UNITED STATES PATENTS

| | | |
|---|---|---|
| 2,599,352 | Schneider | June 3, 1952 |
| 2,649,554 | Anaton | Aug. 18, 1953 |
| 2,699,513 | Watts | Jan. 11, 1955 |